E. WIRTH-FREY.
APPARATUS FOR SUPPRESSING THE FORMATION OF FROTH OR SCUM WHEN BOILING LIQUIDS.
APPLICATION FILED MAR. 4, 1919.
1,316,947.                                    Patented Sept. 23, 1919.
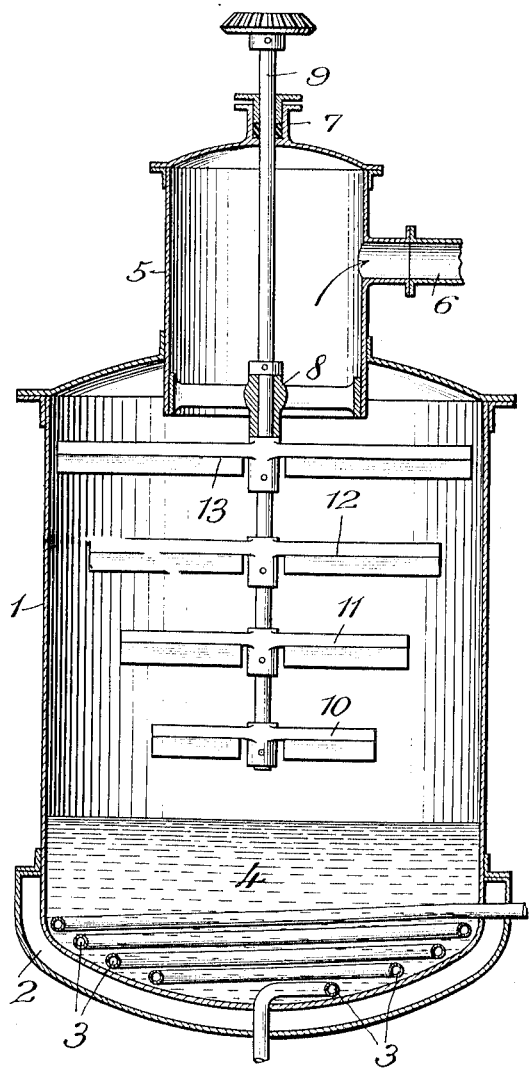
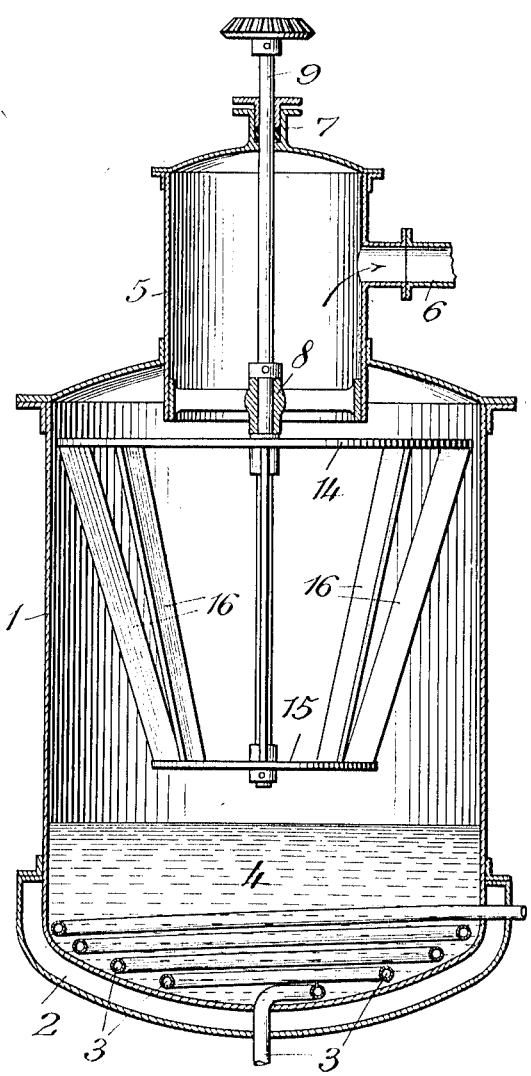
Inventor:
Elias Wirth-Frey.
By Henry Orth
Atty.

UNITED STATES PATENT OFFICE.

ELIAS WIRTH-FREY, OF AARAU, SWITZERLAND.

APPARATUS FOR SUPPRESSING THE FORMATION OF FROTH OR SCUM WHEN BOILING LIQUIDS.

1,316,947.     Specification of Letters Patent.     Patented Sept. 23, 1919.

Application filed March 4, 1919. Serial No. 280,670.

*To all whom it may concern:*

Be it known that I, ELIAS WIRTH-FREY, a citizen of the Republic of Switzerland, residing at Laurenzvorstadt, Aarau, Switzerland, have invented certain new and useful Improvements in Apparatus for Suppressing the Formation of Froth or Scum When Boiling Liquids; and I do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to an apparatus for suppressing the formation of froth or scum when boiling liquids.

The formation of scum when boiling and evaporating liquids, as in the case of soap lyes, gives rise to many disadvantages. In the first place, in order to prevent the liquid from boiling over or the scum from overflowing, it is necessary to give to the kettle or boiler very considerable dimensions in comparison with the volume of the liquid it is required to boil. Secondly in closed receptacles the particles of scum rise high above the surface of the liquid and are carried along by the escaping vapor so that the piping is damaged should the liquids be of a corrosive nature.

In the apparatus according to this invention the suppression of the formation of the froth or scum is attained in the same manner as in the receptacles of great size by increasing the area or surface in which occurs the separation of the steam from the scum. According to the present invention said area or surface is artificially increased within a kettle or boiler of small dimensions so as to exceed the free section of the boiler by means of a rotary agitator or stirrer arranged above the surface of the liquid, the parts of said agitator sweeping the mass of scum being arranged at varying altitudes.

This invention will now be more particularly described with reference to the accompanying drawings illustrating diagrammatically by way of example two constructions of carrying out the invention. In these drawings:

Figure 1 is a vertical cross-section through the first embodiment, and

Fig. 2 a vertical cross-section through the second embodiment of the invention.

Referring at first to Fig. 1, 1 denotes a closed kettle or boiler heated by means of an external steam jacket 2 or by an internal steam coil 3, the liquid 4 being thereby caused to boil. Communicating with the boiler 1 is a steam dome 5 to which a steam escape pipe 6 is connected. Suspended in bearings 7 and 8 is a rotating shaft 9 of an agitator or stirrer comprising vanes 10, 11, 12 and 13 fixed at varying altitudes to said shaft 9.

The described apparatus works as follows:

The quantity of scum or froth produced when boiling a very frothy liquid, for instance soap lyes, depends largely on the activity with which the steam is formed. When the formation of steam is very intensive, the velocity of the steam escaping from the boiling liquid is accordingly great and this steam then carries more water along with it. In this case, the latter is entrained with a greater force so that it produces a great quantity of scum. This great mass of scum rises up to a high level or height before the final separation of the steam from the liquid takes place when the bubbles of froth break up. The velocity of the steam has therefore the greatest influence upon the process taking place within the boiler and the good results obtained with flat but very large kettles or boilers frequently used for boiling liquids of the character mentioned are only due to the reduction of the velocity of the steam attained in such boilers. By the same quantity of generated steam, the velocity of the latter, and consequently also the production of scum will be reduced when the free section of the boiler is great. Such boilers can not be used however in all cases.

The new technical effect obtained in the described apparatus consists in the production of a hollow space within the mass of scum when the agitator is rotated. The lower border of said hollow space is constituted by the surface swept by the lower edges of the vanes 10, while a surface of revolution having a meridian curve passing through the ends of all vanes forms the lateral border of said hollow space.

When the diameter of the boiler is equal to D, the free passage sectional area of said boiler is $=\frac{\pi D^2}{4}$. When it is assumed that the height of the stirring mechanism is equal to D, the area of the lateral surface of the hollow space, i. e. the cylinder swept by the ends of the vanes, is $=\pi D.D$ or $\pi D^2$, or four times greater than the free section of the boiler. In this surface, the dimensions of which are four times greater than those of the free section of the boiler, the bubbles of froth are caused to burst, i. e. the separation of the steam from the scum takes place. Owing to the great dimensions of this surface, the velocity of the steam passing through said surface is then of course also smaller, so that any carrying along of the bubbles of scum beyond said surface will not take place. As however the velocity of passage of the steam in said large surface is a relatively small one, an easy and complete separation of the steam from the scum can be attained even when the number of revolutions of the agitator and the power driving the latter are small and even when the production of scum is great. Owing to this, no vibrations occur in the described apparatus, notwithstanding that the shaft 9 of the agitator is only suspended in the two bearings 7 and 8. It will be seen that the dimensions of the kettle or boiler of the described apparatus are considerably smaller than those of the boilers usually used, which involves considerable savings of materials.

Referring to Fig. 2, 1 denotes again the closed kettle or boiler containing the liquid 4 to be boiled. This boiler 1 is heated by means of the steam jacket 2 and the internal steam coil 3. The steam produced escapes through the steam dome 5 and the pipe 6. Mounted in bearings 7 and 8 is the shaft 9 of the agitator. The latter comprises two sets of arms 14 and 15 and a number of striking or beating arms 16, the ends of which are distributed symmetrically with regard to the axis of the shaft 9 over both sets of arms 14, 15 and fixed thereto. The shaft 9, the sets of arms 14, 15 and the beating arms 16 form together a single piece. The set of arms 14 is greater than the set of arms 15 and the beating arms 16 are inclined relatively to the axis of the shaft 8 so that upon a rotation of the shaft 8 a truncated cone having its smaller base directed downward is generated.

This apparatus works substantially in the same manner as that first described. The portions of the beating arms situated at different altitudes above the surface of the liquid have the effect to produce in the mass of scum a hollow space, so that the surface on which the bubbles are caused to burst or break up is artificially increased and exceeds the free section of the boiler, as the conical surface generated upon a rotation of the beating arms exceeds considerably the cross-sectional area of the boiler.

The action of the apparatus according to this invention is in its principle quite different from that of similar devices hitherto proposed and comprising a boiler provided with a baffle, check wall or the like preventing an overflowing of the scum and provided with an opening for the passage of the steam. In these known apparatus the passage of the scum through said opening is prevented by a stop member arranged in front of said opening and having for instance the shape of a wheel rotating at a high speed. In such an arrangement, the baffle or check wall reduces however the free section of the boiler; thus the velocity of the steam in the passage opening of the baffle will be a relatively great one, the formation of scum being consequently promoted.

What I claim now as my invention is:

1. An apparatus for suppressing the formation of froth or scum when boiling liquids, comprising a boiler having a free space in the bottom portion thereof to contain the liquid to be boiled, and a rotary agitator mounted within the boiler above the boiling zone of the liquid and extending to near the top portion of the boiler, said agitator when rotated forming a hollow space within the steam zone above the liquid whose surface area is greater than the free section of the boiler, whereby the surface or area in which the steam separates from the scum exceeds the free section of the boiler.

2. An apparatus for suppressing the formation of froth or scum when boiling liquids, comprising a boiler having a free space in the bottom portion thereof to contain the liquid to be boiled, a rotary shaft centrally mounted in the boiler above the boiling zone of the liquid, a plurality of inclined agitator members disposed around and carried by the shaft and extending from the plane of the lower end of the latter to near the top of the boiler, and means for rotating the shaft whereby said members generate a truncated conical surface having its smaller base directed downward and forming a hollow space within the steam zone above the liquid whose surface area is considerably greater than the area of the surface of the liquid in the boiler.

3. An apparatus for suppressing the formation of froth or scum when boiling liquids, comprising a boiler having a free space in the bottom portion thereof to contain the liquid to be boiled, a rotary shaft centrally suspended within the boiler above the boiling zone of the liquid, a plurality of inclined beater arms arranged around and carried by the shaft, said arms extending from the plane in which the lower end of the shaft terminates to near the top and inner periphery of the boiler, and means to rotate the shaft, said arms generating a truncated conical surface having its smaller base directed downward and forming a hollow space within the frothing zone above the liquid and so artificially increasing the surface in which the steam separates from the scum that said surface exceeds the free section of the boiler.

In testimony that I claim the foregoing as my invention, I have signed my name.

ELIAS WIRTH-FREY.